(12) United States Patent
Garg et al.

(10) Patent No.: US 8,671,232 B1
(45) Date of Patent: Mar. 11, 2014

(54) SYSTEM AND METHOD FOR DYNAMICALLY MIGRATING STASH TRANSACTIONS

(71) Applicants: Vakul Garg, Shahdara (IN); Varun Sethi, New Delhi (IN)

(72) Inventors: Vakul Garg, Shahdara (IN); Varun Sethi, New Delhi (IN)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/789,661

(22) Filed: Mar. 7, 2013

(51) Int. Cl.
  *G06F 3/00* (2006.01)
  *G06F 13/14* (2006.01)

(52) U.S. Cl.
  USPC .......... 710/55; 710/3; 710/29; 710/305; 711/118; 711/119; 711/122; 711/131; 711/147; 712/220; 712/228

(58) Field of Classification Search
  None
  See application file for complete search history.

(56) References Cited

U.S. PATENT DOCUMENTS

| | | | |
|---|---|---|---|
| 5,222,224 A | 6/1993 | Flynn et al. | |
| 7,773,597 B2 | 8/2010 | Chen | |
| 7,774,522 B2 | 8/2010 | Bouvier | |
| 7,895,431 B2 | 2/2011 | Bouchard | |
| 8,180,973 B1 * | 5/2012 | Armangau et al. | 711/147 |
| 8,266,379 B2 * | 9/2012 | Lee | 711/118 |
| 8,412,886 B2 * | 4/2013 | Kiyota | 711/131 |
| 8,429,315 B1 * | 4/2013 | Chudgar et al. | 710/55 |
| 8,514,232 B2 * | 8/2013 | Mejdrich et al. | 345/505 |
| 2005/0021931 A1 * | 1/2005 | Anderson et al. | 712/220 |
| 2011/0066830 A1 * | 3/2011 | Wolfe et al. | 712/228 |
| 2012/0173819 A1 * | 7/2012 | Solihin | 711/119 |
| 2013/0111138 A1 * | 5/2013 | Suzuki et al. | 711/122 |
| 2013/0297888 A1 * | 11/2013 | Yamashita et al. | 711/141 |

* cited by examiner

Primary Examiner — Tammara Peyton
(74) Attorney, Agent, or Firm — Charles Bergere

(57) ABSTRACT

A system and method for dynamically migrating stash transactions include first and second processing cores, an input/output memory management unit (IOMMU), an IOMMU mapping table, an input/output (I/O) device, a stash transaction migration management unit (STMMU), and an operating system (OS) scheduler. The first core executes a first thread associated with a frame manager. The OS scheduler migrates the first thread from the first core to the second core and generates pre-empt notifiers to indicate scheduling-out and scheduling-in of the first thread from the first core and to the second core. The STMMU uses the pre-empt notifiers to enable dynamic stash transaction migration.

20 Claims, 3 Drawing Sheets

SYSTEM AND METHOD FOR DYNAMICALLY MIGRATING STASH TRANSACTIONS

BACKGROUND OF THE INVENTION

The present invention generally relates to multicore processor systems, and, more particularly, to a system and method for dynamically migrating stash transactions in multicore processor systems used in a computer network.

Multicore processor systems include one or more central processing units (CPUs) that may have a plurality of processor cores. The multiple cores of the CPUs use shared memory and input/output resources for processing data. Multicore processor systems are known for high processing speeds that render them useful for data intensive applications. By virtue of their multicore architecture, the CPUs can execute several instructions simultaneously, thus increasing processing speed considerably. This processing speed can be further increased by stashing, which entails usage of a cache memory. The cache memory is an expensive memory chip having limited storage capacity. Since cache access times are less than those of main memories, frequently accessed data is stored in the cache memory, which reduces processing time and latency associated with instruction steps that require loading/storing of data.

The multicore processor systems by virtue of their processing prowess are used as servers in computer networks such as Ethernet local area networks (LANs). The CPUs of these multicore processor systems used as servers process packets received from input/output (I/O) devices. The packets are stored in a buffer. An input output memory management unit (IOMMU) assigns a stash transaction destination identification (ID) to each packet based on the packet originating I/O device. The stash transaction destination ID includes a cache register ID of a processor core associated with the packet originating I/O device. Stash transactions are then initiated and the packets are broadcast to the various processor cores for processing. Stashing the packets in the respective cache memories of the processor cores ensures faster accesses times and thus reduced latency.

The multiple processor cores simultaneously execute different packets as threads. To efficiently manage power in the above setting, an operating system (OS) scheduler is used. The OS scheduler migrates, i.e., schedules-in and schedules-out, the threads from one core to another. The thread migration is performed in a manner that prevents any of the cores from being overloaded. Each core is provided a count of threads for processing that is in line with its capacity, thereby ensuring load balancing.

Thread migration is also essential for ensuring power efficiency in a multicore processor system. If the multicore processor system is under-utilized, the OS scheduler may choose to migrate threads to a single core and power-down the other cores. This will reduce power consumption of the multicore processing system. However, thread migration is challenging in systems that intend to benefit from stashing. Since the core to which a stash transaction will be directed is fixed at I/O device initialization, thread migration at a later stage of processing becomes cumbersome. This inflexibility may prevent the OS scheduler from effectively managing power and balancing load across the cores.

Therefore, it would be advantageous to have a system and method that enables dynamic migration of stash transactions, thereby enabling thread migration and effective power and load management and that overcomes the above-mentioned limitations of the conventional multicore systems.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE PRESENT INVENTION

Figure 1:
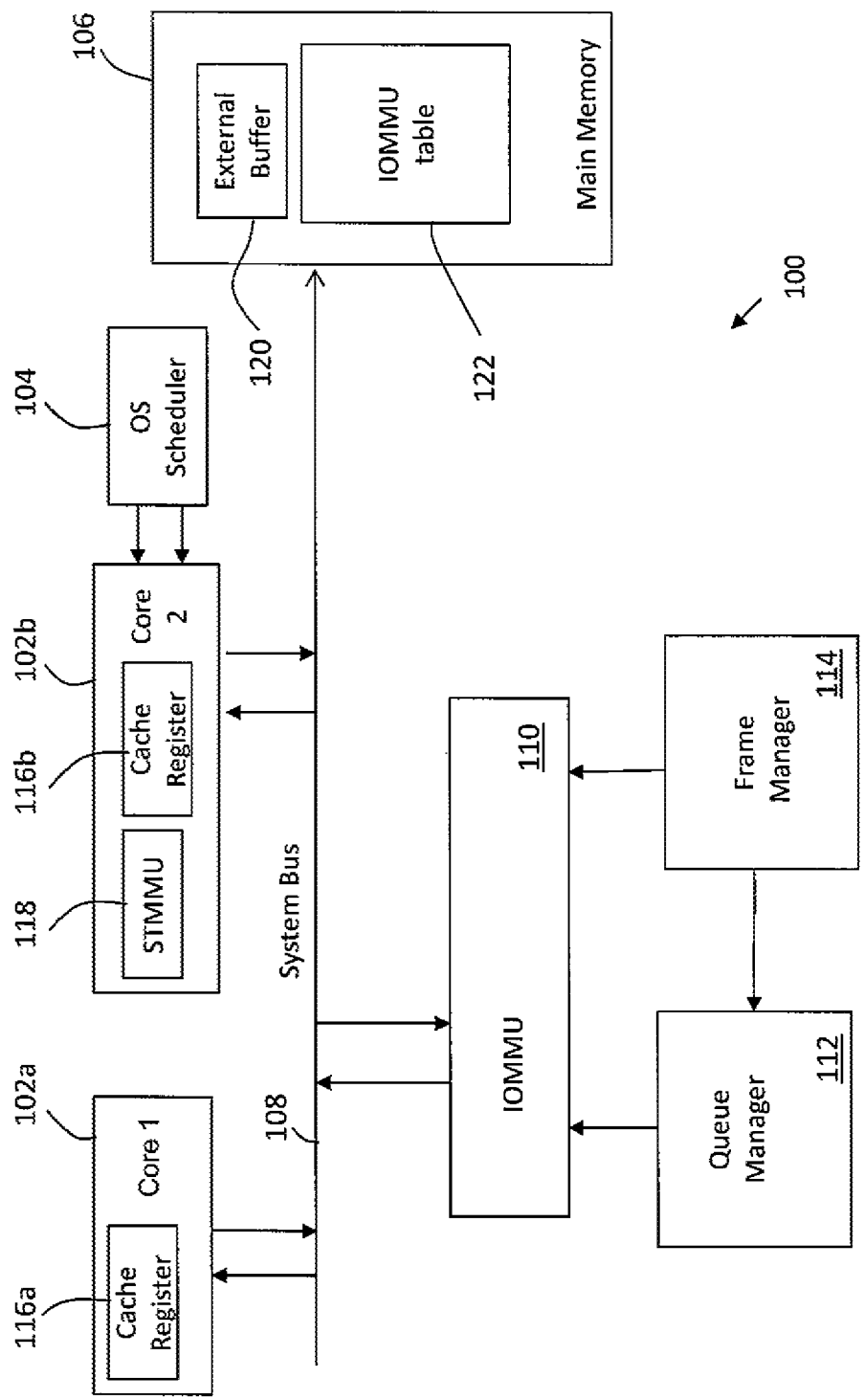
FIG. 1 is a schematic block diagram of a system for migrating a stash transaction between a plurality of processing cores of a multicore processor system in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a system for migrating at least one stash transaction between a plurality of processor cores of a multicore processor system is provided. Each of the cores includes a cache register. The system includes a main memory for storing an input/output memory management unit (IOMMU) mapping table that includes a mapping between a logical input/output (I/O) device number (LIODN) corresponding to an I/O device and a corresponding stash transaction destination identification (ID). The stash transaction destination ID includes a cache register ID associated with a cache register of one of the cores. The system further includes a stash transaction migration management unit (STMMU), coupled to the main memory, for determining a first core ID corresponding to a first core that executes a first thread associated with a first I/O device when the first thread is scheduled-out from the first core. The first I/O device has a corresponding first stash transaction destination ID stored in the IOMMU mapping table. The STMMU determines a second core ID corresponding to a second core that executes the first thread after the first thread is scheduled-in. The STMMU compares the first and second core IDs and updates a stash transaction destination ID field of the IOMMU mapping table corresponding to the first I/O device when the first and second core IDs are different to replace the first stash transaction destination ID with a second stash transaction destination ID. The stash transaction destination ID field corresponding to the first I/O device stores the first stash transaction destination ID. The STMMU also updates a second cache register ID associated with a cache register of the second core when the first and second core IDs are different to replace the second cache register ID with a first cache register ID associated with a cache register of the first core.

The system further includes a frame manager for generating a first data frame, initiating a direct memory access (DMA) transaction for storing the first data frame in an external buffer of the main memory, and initiating the at least one stash transaction. The system further includes an IOMMU coupled to the main memory, the frame manager, and the plurality of cores, for validating the DMA transactions initiated by the frame manager using a LIODN of the frame manager, determining a stash destination for the at least one stash transaction by accessing the IOMMU mapping table.

In another embodiment of the present invention, a method for migrating at least one stash transaction between a plurality of cores of a multicore processor system using an input/output memory management unit (IOMMU) mapping table is provided. The IOMMU mapping table includes a mapping between an input/output (I/O) device and corresponding stash transaction destination identification (ID). The I/O device transmits a data frame to at least one of the cores, and the stash transaction destination ID includes a cache register ID associated with the at least one core. The method includes determining a first core ID corresponding to a first core of the plurality of cores that executes a first thread associated with a first I/O device when the first thread is scheduled-out from the first core. The first I/O device has a corresponding first stash transaction destination ID stored in the IOMMU mapping table, and the first stash transaction destination ID includes a first cache register ID associated with a cache register of the first core. The method further includes determining a second core ID corresponding to a second core that executes the first thread after the first thread is scheduled-in. The method further includes comparing the first and second core IDs and updating the IOMMU mapping table corresponding to the first I/O device when the first and second core IDs are different to replace the first stash transaction destination ID with a second stash transaction destination ID. The second stash transaction destination ID includes a second cache register ID associated with a cache register of the second core. The method further includes initiating the at least one stash transaction that corresponds to a first data frame received from the first I/O device, broadcasting the at least one stash transaction to the plurality of cores, and storing the first data frame in the cache register of the second core.

In yet another embodiment of the present invention, a method for migrating at least one stash transaction between a plurality of cores in a multicore processor system using an input/output memory management unit (IOMMU) mapping table is provided. The IOMMU mapping table includes a mapping between an input/output (I/O) device and corresponding stash transaction destination identification (ID). The I/O device transmits a data frame to at least one of the cores, and the stash transaction destination ID includes a cache register ID associated with the at least one core. The method includes determining a first core ID corresponding to a first core of the plurality of cores that executes a first thread associated with a first I/O device when the first thread is scheduled-out from the first core. The first I/O device has a corresponding first stash transaction destination ID stored in the IOMMU mapping table, and the first stash transaction destination ID includes a first cache register ID associated with a cache register of the first core. The method further includes determining a second core ID corresponding to a second core that executes the first thread after the first thread is scheduled-in. The method further includes comparing the first and second core IDs and updating a second cache register ID associated with a cache register of the second core when the first and second core IDs are different to replace the second cache register ID with the first cache register ID. The second stash transaction destination ID includes a second cache register ID associated with a cache register of the second core. The method further includes initiating the at least one stash transaction that corresponds to a first data frame received from the first I/O device, broadcasting the at least one stash transaction to the plurality of cores, and storing the first data frame in the cache register of the second core.

Various embodiments of the present invention provide a system and method for dynamically migrating stash transactions. The system includes at least first and second cores, an IOMMU, an IOMMU mapping table, a first I/O device, i.e., a frame manager, an STMMU, and an OS scheduler. The first core executes a first thread associated with the frame manager. The IOMMU mapping includes mapping between one or more I/O devices and one or more stash transaction destination IDs that include one or more cache register IDs of cache registers associated with one or more cores. The OS scheduler migrates the first thread from the first core to the second core and generates pre-empt notifiers to indicate scheduling-out and scheduling-in of the first thread from the first core and to the second core. The pre-empt notifiers include first and second core IDs corresponding to schedule-out and schedule-in cores, respectively. The STMMU detects the migration of the first thread using the pre-empt notifiers and compares the first and second core IDs. Since the first thread is migrated from the first core to the second core, the first and second core IDs are different. The STMMU updates the IOMMU mapping table to replace a first stash transaction destination ID that includes a first cache register ID corresponding to a cache register of the first core and corresponding to a first I/O device with a second stash transaction destination ID that includes a second cache register ID corresponding to a cache register of the second core. Thus, any subsequent stash transactions that are originated by the first I/O device are redirected to the second core, which executes the first thread after migration. Thus, updating the IOMMU mapping table enables dynamic migration of stash transactions whenever a corresponding thread is migrated, thereby simultaneously enabling thread migration and stashing in multicore processor systems. Enabling thread migration further leads to effective load balancing and power management in multicore processor systems.

Referring now to FIG. 1, a schematic block diagram of a system 100 for migrating a stash transaction between a plurality of processor cores of a multicore processing system is shown in accordance with an embodiment of the present invention. The system 100 includes first and second cores 102a and 102b, an operating system (OS) scheduler 104, a main memory 106, a system bus 108, an input output memory management unit (IOMMU) 110, a queue manager 112, and a frame manager 114. The first core 102a includes a first cache register 116a. The second core 102b includes a second cache register 116b and a stash transaction migration management unit (STMMU) 118. The main memory 106 includes an external buffer 120 and an IOMMU table 122.

The first and second cores 102a and 102b execute threads that correspond to one or more data frames originated by one or more input/output (I/O) devices, e.g., the frame manager 114. The OS scheduler 104 periodically migrates the threads between the first and second processing cores 102a and 102b based on a predetermined set of conditions. In an embodiment of the present invention, the predetermined set of conditions may relate to load distribution and power management across the first and second cores 102a and 102b. Thus, in an example of thread migration, the OS scheduler 104 may schedule-out a first thread corresponding to a first I/O device, i.e., the frame manager 114, executing on the first core 102a and schedule the first thread to the second core 102b for execution to obtain better load balancing or power management. The details of thread migration are generally understood by those of skill in the art and further explanation thereof is not required for a complete understanding of the present invention.

The OS scheduler 104 generates pre-empt notifiers when it schedules-out/schedules-in the first thread. In the above example, when the first thread is scheduled-out from the first core 102a, the OS scheduler 104 generates a schedule-out pre-empt notifier. The schedule-out pre-empt notifier includes a first core identification (ID) corresponding to the first core 102a. Thereafter, when the first thread is scheduled-in to the second core 102b, the OS scheduler 104 generates a schedule-in pre-empt notifier that includes a second core ID corresponding to the second core 102b.

The STMMU 118 detects migration of the first thread by detecting the generation of the pre-empt notifiers. The STMMU 118 extracts the first and second core IDs from the pre-empt notifiers and compares these two core IDs. Since the first thread is migrated to a different core, i.e., the second core 102b, the STMMU 118 determines that the first and second core IDs are different. Therefore, the STMMU 118 updates the IOMMU mapping table 122 stored in the main memory 106 to redirect subsequent stash transactions originating from the frame manager 114 to the second processing core 102b. A simple comparator may be used to compare the core IDs and determine whether or not they are the same or different.

The IOMMU mapping table 122 includes a mapping between logical input output device numbers (LIODNs) of the one or more I/O devices, e.g., the frame manager 114 and one or more stash transaction destination IDs. The stash transaction destination IDs include cache register IDs, e.g., first and second cache register IDs associated with first and second cache registers 116a and 116b of the first and second cores 102a and 102b. The stash transaction destination IDs provide directions to one or more data frames received from the one or more I/O devices that need to be transmitted to the first and second cache registers 116a and 116b during stash transactions. Stashing of the one or more data frames in the first and second cache registers 116a and 116b enables faster data access thereby reducing latency and improving processing speed. In an embodiment of the present invention, the IOMMU mapping table 122 is stored in a fast or low latency memory such as a memory (cache) chip that is separate from the main memory 106 but accessible to the STMMU 118.

To migrate the subsequent stash transactions originating from the frame manager 114 to the second cache register 116b, the STMMU 118 updates the IOMMU mapping table 122 to replace a first stash transaction destination ID that includes a first cache register ID associated with the first cache register 116a with a second stash transaction destination ID that includes a second cache register ID associated with the second cache register 116b.

In an embodiment of the present invention, instead of updating the IOMMU mapping table 122, the STMMU 118 updates the first and second cache register IDs to replace the second cache register ID with the first cache register ID. Replacing the second cache register ID with the first cache register ID ensures the stash transactions directed toward the first cache register 116a to reach the second cache register 116b. In another embodiment of the present invention, instead of updating the IOMMU mapping table 122 and the first and second cache register IDs, the STMMU 118 replaces a LIODN of the first I/O device, i.e., the frame manager 114, with a LIODN of the second I/O device. Since, the IOMMU mapping table 122 includes a mapping between the LIODN of the second I/O device and the second stash transaction destination ID including the second cache register ID, the subsequent stash transactions that originate from the first I/O device are automatically redirected to the second cache register 116b.

In various embodiments of the present invention, the first and second cores 102a and 102b communicate with the IOMMU 110, the main memory 106, the queue manager 112, and the frame manager 114 through the system bus 108.

Figure 2A:
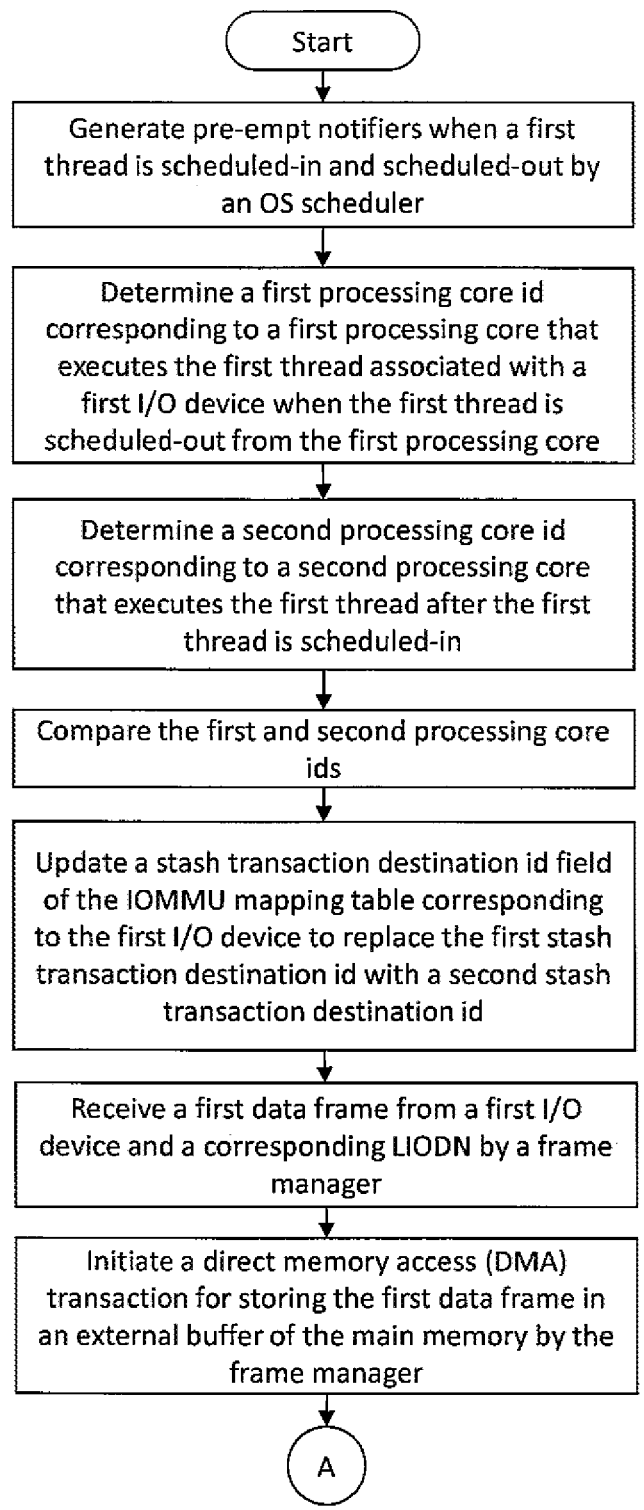
FIGS. 2A and 2B are a flowchart of a method for migrating a stash transaction between a plurality of processor cores of a multicore processor system in accordance with an embodiment of the present invention.
Figure 2B:
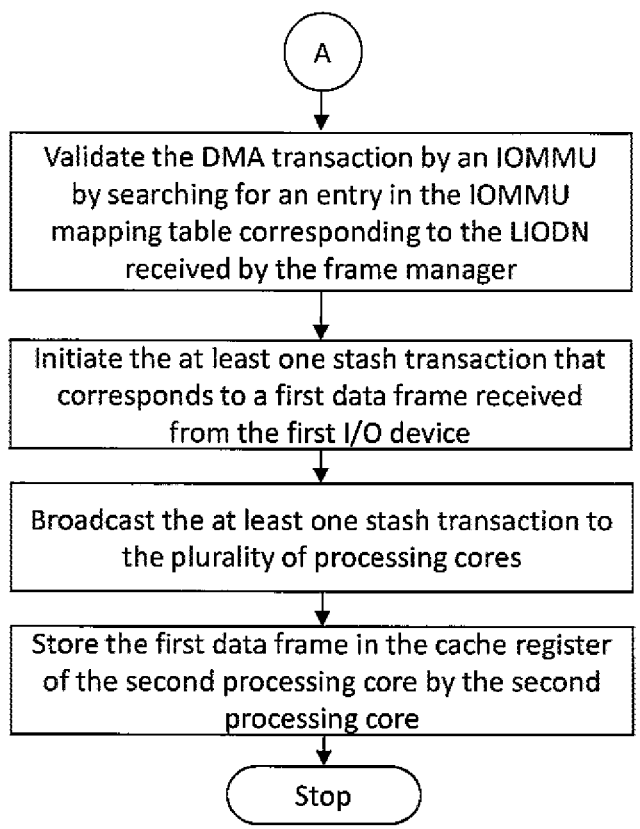

Referring now to FIGS. 2A and 2B, a flowchart depicting a method for migrating a stash transaction between a plurality of processor cores of a multicore system in accordance with an embodiment of the present invention is shown. FIGS. 2A and 2B will be explained below in conjunction with FIG. 1.

At step 202, the OS scheduler 104 schedules-out the first thread from the first core 102a and generates the schedule-out pre-empt notifier including the first core ID corresponding to the first core 102a. The OS scheduler 104 then schedules-in the first thread to the second core 102b for execution and generates the schedule-in pre-empt notifier including the second core ID corresponding to the second core 12b. At step 204, the STMMU 118 detects migration of the first thread based on the generation of the schedule-out/in pre-empt notifiers by the OS scheduler 104. The STMMU 118 determines the first core ID corresponding to the first core 102a using the schedule-out pre-empt notifier.

At step 206, the STMMU 118 determines the second core ID corresponding to the second processing core 102b using the schedule-in pre-empt notifier generated by the OS scheduler 104. At step 208, the STMMU 118 compares the first and second core IDs to determine if the first and second core IDs are different. In an example, the first thread may be scheduled-out from the first core 102a and thereafter scheduled-in to the same first core 102a, causing processing core IDs generated as part of the schedule-out and schedule-in pre-empt notifiers to be identical. In the above mentioned example, subsequent stash transactions originated by the frame manager 114 will not require any redirection. Thus, the STMMU 118 terminates further processing and waits for a subsequent thread migration. However, if the STMMU 118 determines that the first and second core IDs are different then step 210 is executed.

At step 210, the STMMU 118 updates the IOMMU mapping table 122 to replace the first stash transaction destination ID that includes the first cache register ID associated with the first cache register 116a with the second stash transaction destination ID that includes the second cache register ID associated with the second cache register 116b. Updating the IOMMU mapping table 122 in the above-mentioned manner ensures that the subsequent stash transactions originated at the frame manager 114 are redirected to the second cache register 116b.

At step 212, the frame manager 114 originates a data frame for processing. The data frame and the LIODN corresponding to the frame manager 114 are stored in a frame queue that is maintained by the queue manager 112. At step 214, the frame manager 114 initiates a direct memory access (DMA) transaction for copying the data frame into the external buffer 120 from the frame queue. At step 216, the DMA transaction initiated by the frame manager 114 is validated by the IOMMU 110 by searching for an entry in the IOMMU mapping table 122 corresponding to the LIODN of the frame manager 114. Upon successful validation of the DMA transaction, the data frame is copied into the external buffer 120.

At step 218, the stash transaction corresponding to the data frame received from the frame manager 114 is initiated by the frame manager 114. In an embodiment of the present invention, subsequent to copying the data frame into the external buffer 120, the IOMMU 110 translates the DMA transaction initiated by the frame manager 114 and allocates the second stash transaction destination ID to the data frame received from the frame manager 114 using the updated IOMMU mapping table 122. In another embodiment of the present invention, subsequent to storage of the data frame in the external buffer 120, the stash transaction is initiated by the queue manager 112 that causes the IOMMU 110 to allocate the second stash transaction destination ID to the data frame received from the frame manager 114. At step 220, the stash transaction is broadcast to the first and second cores 102*a* and 102*b*. The broadcast of the stash transaction includes transmitting the data frame along with the second stash transaction destination ID to the first and second cores 102*a* and 102*b*. In an embodiment of the present invention, the stash transaction is broadcast by the queue manager 112. In another embodiment of the present invention, the stash transaction is broadcast by the frame manager 114.

At step 222, the broadcasted stash transaction is captured by the second core 102*b* because the second stash transaction destination ID that includes the second cache register ID corresponding to the second cache register 116*b* is allocated to the broadcasted stash transaction. Thereafter, the data frame associated with the stash transaction is stored by the second core 102*b* in the second cache register 116*b*.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for migrating at least one stash transaction between a plurality of processor cores of a multicore processor system, wherein each of the plurality of cores includes a cache register, the system comprising:
   a main memory for storing an input/output memory management unit (IOMMU) mapping table that includes a mapping between a logical input/output (I/O) device number (LIODN) corresponding to an I/O device and a corresponding stash transaction destination identification (ID), wherein the stash transaction destination ID includes a cache register ID associated with a cache register of one of the cores of the plurality of cores;
   a stash transaction migration management unit (STMMU), coupled to the main memory, for determining a first core ID of a first core that executes a first thread associated with a first I/O device when the first thread is scheduled-out from the first core, wherein the first I/O device has a corresponding first stash transaction destination ID stored in the IOMMU mapping table, determining a second core ID of a second core that executes the first thread after the first thread is scheduled-in, comparing the first and second core IDs, updating a stash transaction destination ID field of the IOMMU mapping table corresponding to the first I/O device when the first and second core IDs are different to replace the first stash transaction destination ID with a second stash transaction destination ID, wherein the stash transaction destination ID field for the first I/O device stores the first stash transaction destination ID, and updating a second cache register ID associated with a cache register of the second core when the first and second core IDs are different to replace the second cache register ID with a first cache register ID associated with a cache register of the first core;
   a frame manager for generating a first data frame, initiating a direct memory access (DMA) transaction for storing the first data frame in an external buffer of the main memory, and initiating the at least one stash transaction; and
   an IOMMU, coupled to the main memory, the frame manager, and the plurality of cores, for validating the DMA transaction initiated by the frame manager using a LIODN of the frame manager and determining a stash destination for the at least one stash transaction by accessing the IOMMU mapping table.

2. The system of claim 1, wherein the STMMU is connected to an operating system (OS) scheduler for receiving pre-empt notifiers generated when the first thread is scheduled-in and scheduled-out.

3. The system of claim 2, wherein the STMMU determines the first and second core IDs using the pre-empt notifiers generated by the OS scheduler.

4. The system of claim 3, wherein the IOMMU validates the DMA transaction by searching for an entry in the IOMMU mapping table corresponding to the LIODN of the frame manager.

5. The system of claim 4, wherein the IOMMU is coupled to the plurality of cores and the main memory by way of a system bus.

6. The system of claim 4, wherein the STMMU executes in at least one of the plurality of cores.

7. The system of claim 4, further comprising a queue manager, coupled to the frame manager, for broadcasting the at least one stash transaction to the plurality of cores.

8. A method for migrating at least one stash transaction between a plurality of processor cores of a multicore processor system using an input/output memory management unit (IOMMU) mapping table, wherein the IOMMU mapping table includes a mapping between an input/output (I/O) device and a corresponding stash transaction destination identification (ID), wherein the I/O device transmits a data frame to at least one core of the plurality of cores, and wherein the stash transaction destination ID includes a cache register ID associated with a corresponding core, the method comprising:
   determining a first core ID corresponding to a first core of the plurality of cores that executes a first thread associated with a first I/O device when the first thread is scheduled-out from the first core, wherein the first I/O device has a corresponding first stash transaction destination ID stored in the IOMMU mapping table, and wherein the first stash transaction destination ID includes a first cache register ID associated with a cache register of the first core;
   determining a second core ID corresponding to a second core that executes the first thread after the first thread is scheduled-in;
   comparing the first and second core IDs;
   updating the IOMMU mapping table corresponding to the first I/O device when the first and second core IDs are different to replace the first stash transaction destination ID with a second stash transaction destination ID, wherein the second stash transaction destination ID includes a second cache register ID associated with a cache register of the second core;
   initiating the at least one stash transaction that corresponds to a first data frame received from the first I/O device;
   broadcasting the at least one stash transaction to the plurality of cores; and
   storing the first data frame in the cache register of the second core.

9. The method of claim 8, wherein the first thread is scheduled-in and scheduled-out by an operating system (OS) scheduler.

10. The method of claim 9, further comprising generating pre-empt notifiers when the first thread is scheduled-in and scheduled-out by the OS scheduler.

11. The method of claim 8, wherein the IOMMU mapping table stores a mapping between a logical I/O device number (LIODN) corresponding to the at least one I/O device and the stash transaction destination ID.

12. The method of claim 8, further comprising initiating a direct memory access (DMA) transaction for storing the first data frame in an external buffer of the main memory by the frame manager.

13. The method of claim 12, further comprising validating the DMA transaction by an IOMMU by searching for an entry in the IOMMU mapping table corresponding to a LIODN of the first I/O device.

14. The method of claim 8, further comprising updating the second cache register ID when the first and second core IDs are different to replace the second cache register ID with the first cache register ID.

15. The method of claim 8, wherein the at least one stash transaction is initiated and broadcasted by a queue manager.

16. The method of claim 8, wherein updating the IOMMU mapping table includes updating a stash transaction destination ID field by a stash transaction migration management unit (STMMU) corresponding to the first I/O device that stores the first stash transaction destination ID.

17. The method of claim 8, wherein the first and second core IDs corresponding to the first and second cores, respectively, are determined by the STMMU when the first thread is scheduled-out and scheduled-in.

18. A method for migrating at least one stash transaction between a plurality of processor cores in a multicore processing system using an input/output memory management unit (IOMMU) mapping table, wherein the IOMMU mapping table includes a mapping between an input/output (I/O) device and a corresponding stash transaction destination identification (ID), wherein the I/O device transmits a data frame to at least one core of the plurality of cores, and wherein the stash transaction destination ID includes a cache register ID associated with a corresponding core, the method comprising:
  determining a first core ID corresponding to a first core of the plurality of cores that executes a first thread associated with a first I/O device when the first thread is scheduled-out from the first core, wherein the first I/O device has a corresponding first stash transaction destination ID stored in the IOMMU mapping table, and wherein the first stash transaction destination ID includes a first cache register ID associated with a cache register of the first core;
  determining a second core ID corresponding to a second core that executes the first thread after the first thread is scheduled-in;
  comparing the first and second core IDs;
  updating a second cache register ID associated with a cache register of the second core when the first and second core IDs are different to replace the second cache register ID with the first cache register ID;
  initiating the at least one stash transaction that corresponds to a first data frame received from the first I/O device;
  broadcasting the at least one stash transaction to the plurality of cores; and
  storing the first data frame in the cache register of the second core.

19. The method of claim 18, further comprising updating the IOMMU mapping table corresponding to the first I/O device when the first and second core IDs are different to replace the first stash transaction destination ID with a second stash transaction destination ID, wherein the second stash transaction destination ID includes the second cache register ID associated with a cache register of the second core.

20. The method of claim 19, further comprising updating the LIODN of the first I/O device when the first and second core IDs are different to replace the LIODN of the first I/O device with a LIODN of a second I/O device.

* * * * *